(12) United States Patent
Bleeker

(10) Patent No.: US 9,556,796 B2
(45) Date of Patent: Jan. 31, 2017

(54) HIGH TEMPERATURE FUEL MANIFOLD FOR GAS TURBINE ENGINES

(71) Applicant: Delavan Inc, West Des Moines, IA (US)

(72) Inventor: Daniel Edward Bleeker, Ankeny, IA (US)

(73) Assignee: Delavan Inc, West Des Moines, IA (US)

( * ) Notice: Subject to any disclaimer, the term of this patent is extended or adjusted under 35 U.S.C. 154(b) by 802 days.

(21) Appl. No.: 13/910,573

(22) Filed: Jun. 5, 2013

(65) Prior Publication Data

US 2013/0263602 A1 Oct. 10, 2013

Related U.S. Application Data

(63) Continuation-in-part of application No. 12/889,275, filed on Sep. 23, 2010, now Pat. No. 8,713,944.

(51) Int. Cl.
*F02C 7/22* (2006.01)
*F02C 7/25* (2006.01)
*F02C 7/24* (2006.01)

(52) U.S. Cl.
CPC .............. *F02C 7/222* (2013.01); *F02C 7/24* (2013.01); *F02C 7/25* (2013.01); *F05D 2250/61* (2013.01)

(58) Field of Classification Search
CPC .............. F02C 7/222; F02C 7/24; F02C 7/25; F05D 2250/61
See application file for complete search history.

(56) References Cited

U.S. PATENT DOCUMENTS

| 2,787,289 | A |   | 4/1957  | Press |
|-----------|---|---|---------|-------|
| 2,913,011 | A |   | 11/1959 | Noyes et al. |
| 3,251,612 | A |   | 5/1966  | Webbe |
| 3,420,553 | A |   | 1/1969  | Poxon et al. |
| 3,913,625 | A |   | 10/1975 | Gazda et al. |
| 4,122,968 | A | * | 10/1978 | Germain ............... B60K 15/04 138/114 |
| 4,274,549 | A | * | 6/1981  | Germain ............. B60K 15/035 138/113 |

(Continued)

FOREIGN PATENT DOCUMENTS

| DE | 3445359 A1 | 6/1986 |
| EP | 2434129 A2 | 3/2012 |

(Continued)

OTHER PUBLICATIONS

Extended European Search Report Application No. 11250765.2-1610 / 2434129 dated Mar. 8, 2016.

*Primary Examiner* — Craig Kim
(74) *Attorney, Agent, or Firm* — Locke Lord LLP; Scott D. Wofsy; Joshua L. Jones

(57) ABSTRACT

A segment of a fluid manifold includes a flexible thermal shield with an insulation space defined inboard of the thermal shield to provide thermal isolation from conditions external to the thermal shield. The thermal shield includes a helically corrugated metal tube having opposed first and second ends. An outer collar is threaded to an end of the helically corrugated metal tube. The outer collar includes a crimped portion and an uncrimped portion. The uncrimped portion is spaced apart from the corrugated helical metal tube more than the crimped portion to define a vent between the outer collar and the corrugated helical metal tube in venting communication with the insulation space to vent hot gases.

20 Claims, 3 Drawing Sheets

(56) References Cited

U.S. PATENT DOCUMENTS

| | | | |
|---|---|---|---|
| 4,467,610 A | 8/1984 | Pearson et al. | |
| 4,509,559 A | 4/1985 | Cheetham et al. | |
| 5,197,288 A | 3/1993 | Newland et al. | |
| 5,580,186 A | 12/1996 | Tassone et al. | |
| 8,713,944 B2 * | 5/2014 | Bleeker | F02C 7/222 60/739 |
| 2002/0117226 A1 * | 8/2002 | Malcarne, Jr. | F16L 11/115 138/121 |
| 2002/0145284 A1 * | 10/2002 | Powell | F16L 25/0036 285/353 |
| 2002/0189698 A1 | 12/2002 | Grepaly et al. | |
| 2004/0050440 A1 * | 3/2004 | Vohrer | E03C 1/021 138/109 |
| 2004/0150224 A1 * | 8/2004 | Lee | F16L 37/086 285/317 |
| 2007/0044765 A1 | 3/2007 | Lincourt | |
| 2010/0126617 A1 | 5/2010 | Stroempl et al. | |
| 2012/0073299 A1 | 3/2012 | Bleeker | |
| 2013/0263602 A1 * | 10/2013 | Bleeker | F02C 7/24 60/739 |

FOREIGN PATENT DOCUMENTS

| | | |
|---|---|---|
| WO | WO-9114896 A1 | 10/1991 |
| WO | WO-9208924 A1 | 5/1992 |
| WO | WO-2008118732 A1 | 10/2008 |

* cited by examiner

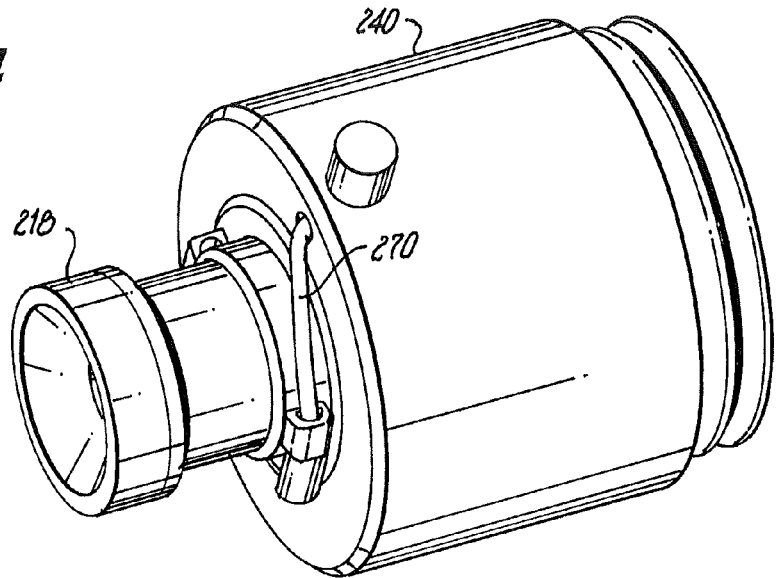
Fig. 4
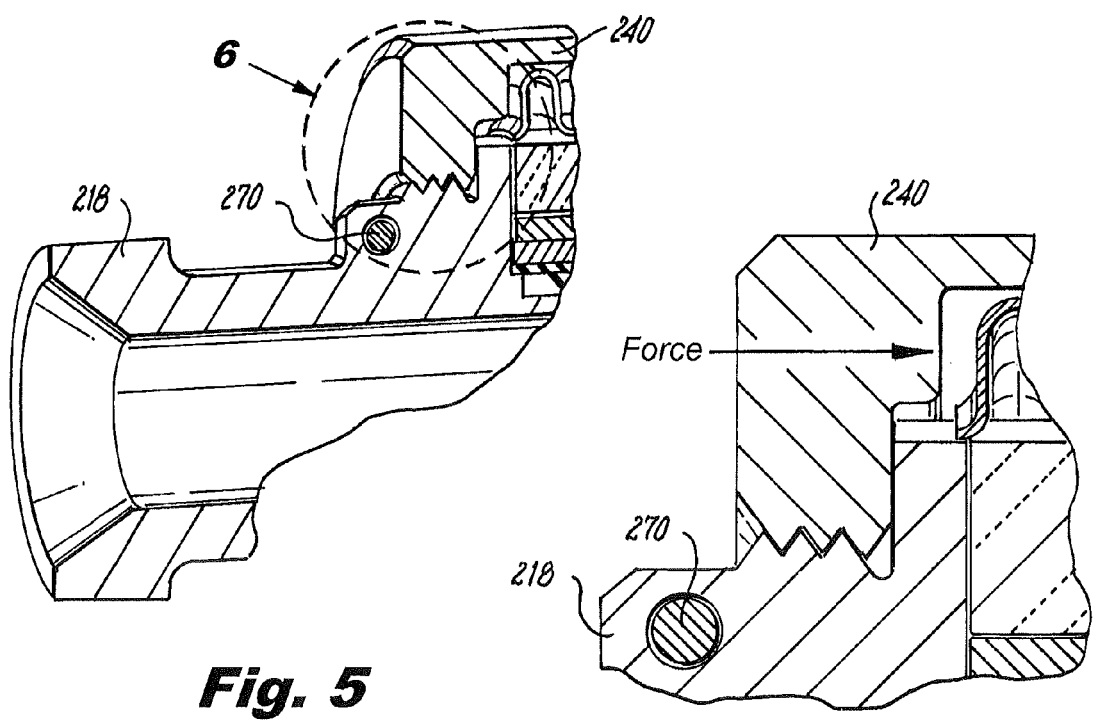
Fig. 5
Fig. 6

HIGH TEMPERATURE FUEL MANIFOLD FOR GAS TURBINE ENGINES

CROSS-REFERENCE TO RELATED APPLICATIONS

This application is a continuation in part of U.S. patent application Ser. No. 12/889,275 filed Sep. 23, 2010, which is incorporated by reference herein in its entirety.

BACKGROUND OF THE INVENTION

1. Field of the Invention

The present invention relates to fluid distribution manifolds, and more particularly to high temperature fuel manifolds for gas turbine engines.

2. Description of Related Art

The fuel manifold system of a gas turbine engine distributes fuel from a fuel control system to a plurality of fuel injectors mounted on the engine case. The fuel injectors are configured to issue atomized fuel into the combustor of the engine. It is well known that combustor inlet air temperatures can be extremely high (e.g., 1300° F., 704.4° C.), and the combustion of fuel drives temperatures even higher. High combustor temperatures are necessary in order to fully ignite the fuel and to derive the maximum amount of energy available from the burning fuel in a turbine, and often a nozzle, located downstream of the combustor. Under basic thermodynamic principals, increasing the temperature and/or pressure of combustion gases increases the amount of useful energy that can be produced. As gas turbine engine technologies have advanced, higher and higher operating temperatures have become possible, making for increasingly powerful and efficient engines.

The high operating temperatures in modern gas turbine engines put a tremendous thermal strain on engine components associated with the combustor casing. These engine components must structurally accommodate thermal expansion and contraction of the combustor casing during engine operating cycles. There is a particularly high gradient of thermal expansion at the fuel manifold, where the internal fuel temperature is relatively low compared to the external gas temperatures. A combustor casing is typically around room temperature prior to engine start up, and then heats up to a high operating temperature during high power engine operation, such as during takeoff. While the combustor casing expands and contracts considerably with these thermal cycles of the engine, the fuel manifold undergoes comparatively little thermal expansion due to the relatively cool fuel flowing through it. This cycling difference in thermal expansion between the engine case and fuel manifold must be accommodated to avoid stress related failures.

Traditionally, thermal expansion of the combustor case has been accommodated by using curved metal tubes to flexibly connect the fuel lines of the manifold assembly to the fuel injectors. An example of a fuel manifold assembly that includes curved metal tubes is shown in U.S. Pat. No. 5,197,288 to Newland et al. Prior art designs of this type have certain disadvantages such as susceptibility to vibration and fatigue.

Another solution has been to use flexible hoses to connect between injector fixtures of the manifold assembly to accommodate thermal expansion. The United States Military Defense Standards MIL-DTL-25579 establishes an upper limit of 450° F. (232.2° C.) for the air around a flexible fuel manifold in a gas turbine engine. However, today's high performance gas turbine engines have air temperatures outside the engine case that far exceed that standard. Typical fuel systems are expected to be able to routinely operate in temperatures in excess of 800° F. (426.67° C.).

Additionally, the Federal Aviation Authority (FAA) requires that commercial engine fuel systems undergo a flame endurance test to ensure that the fuel systems can safely operate even under prolonged exposure to flames. Exposure to flames can compromise fuel manifold hoses. It is known to provide a fire sleeve around the hose portions of such manifolds to improve flame resistance. However as gas turbine technology advances, the operating temperatures continue to rise to levels that can compromise even hoses with conventional fire sleeves.

One solution to this problem has been to utilize a telescoping outer wall outside the fire sleeve, as disclosed in U.S. Pat. No. 4,467,610 to Pearson et al. While this may improve the ability of a manifold to endure high temperatures and flames, such mechanisms add to the cost and mechanical complexity of flexible hose type fuel manifolds. Additional solutions are described in commonly assigned U.S. Patent Application Publication No. 2012/0073299, which is incorporated by reference herein in its entirety.

Such conventional methods and systems have generally been considered satisfactory for their intended purpose. However, there is still a need in the art for fuel manifolds that allow for improved high temperature operation and flame resistance. There also remains a need in the art for such manifolds that are easy to make and use. The present invention provides a solution for these problems.

SUMMARY OF THE INVENTION

A new and useful segment of a fluid manifold includes a flexible thermal shield with an insulation space defined inboard of the thermal shield to provide thermal isolation from conditions external to the thermal shield. The thermal shield includes a helically corrugated metal tube having opposed first and second ends. An outer collar is threaded to a first end of the helically corrugated metal tube. A vent is defined between the outer collar and the flexible thermal shield in venting communication with the insulation space.

In certain embodiments, the outer collar includes a crimped portion and an uncrimped portion. The uncrimped portion is spaced apart from the helically corrugated metal tube more than the crimped portion to define the vent between the outer collar and the helically corrugated metal tube in venting communication with the insulation space. It is contemplated that there can be four crimped portions circumferentially alternating with four respective uncrimped portions to form four vents from the insulation space to an area outside the flexible thermal shield.

In another aspect, a liner defining an internal fluid passage therethrough fluidly connects a pair of hose fitting inserts. The flexible thermal shield is outboard of the liner, and the insulation space is defined between the liner and the flexible thermal shield. The outer collar can include fitting threads engaged with threads on one of the hose fitting inserts. The fitting threads of the outer collar can be structurally ovalized relative to the threads of the hose fitting insert engaged thereto to prevent unthreading of the collar.

In accordance with certain embodiments, a lock wire can connect the outer collar to the hose fitting insert engaged thereto to prevent de-threading of the outer collar. A weld can join the lock wire to the outer collar and a weld joining the lock wire to the hose fitting insert engaged to the outer collar. It is also contemplated that a cable can connect the outer collar to the hose fitting insert engaged thereto to prevent de-threading of the outer collar. It is further contemplated that the collar and the hose fitting insert engaged thereto can include at least one staked portion that is locally deformed to prevent de-threading of the outer collar. It is also contemplated that at least one weld can join the outer collar to the hose fitting insert engaged to the outer collar.

In certain embodiments, a wire braid layer surrounds the liner inboard of the flexible thermal shield. A fire sleeve can be included, e.g., surrounding the wire braid layer, wherein the insulation space is defined between the fire sleeve and the thermal shield to thermally isolate the fire sleeve from conditions external to the thermal shield. The fire sleeve can include a layer of high temperature fiberglass insulation, for example, the fire sleeve can include an AS1072 silicone rubber coated fiber glass fire sleeve.

A fuel manifold for distributing fuel to a gas turbine engine can include a plurality of interconnected manifold segments. Each manifold segment extends between a pair of fuel injector inlet fittings, wherein each manifold segment is as described above.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 4 is a perspective view of a portion of another exemplary embodiment of a segment of a fuel manifold, showing a lock wire engaged to prevent de-threading of the outer collar;

FIG. 5 is a cross-sectional elevation view of a portion of the outer collar and lock wire of FIG. 4, showing the thread engagement of the hose fitting insert and outer collar;

FIG. 6 is a cross-sectional elevation view of a portion of the outer collar and hose fitting insert of FIG. 5, showing how the outer collar is bottomed out on the flange of the hose fitting insert;

DETAILED DESCRIPTION OF THE PREFERRED EMBODIMENTS

Figure 1:
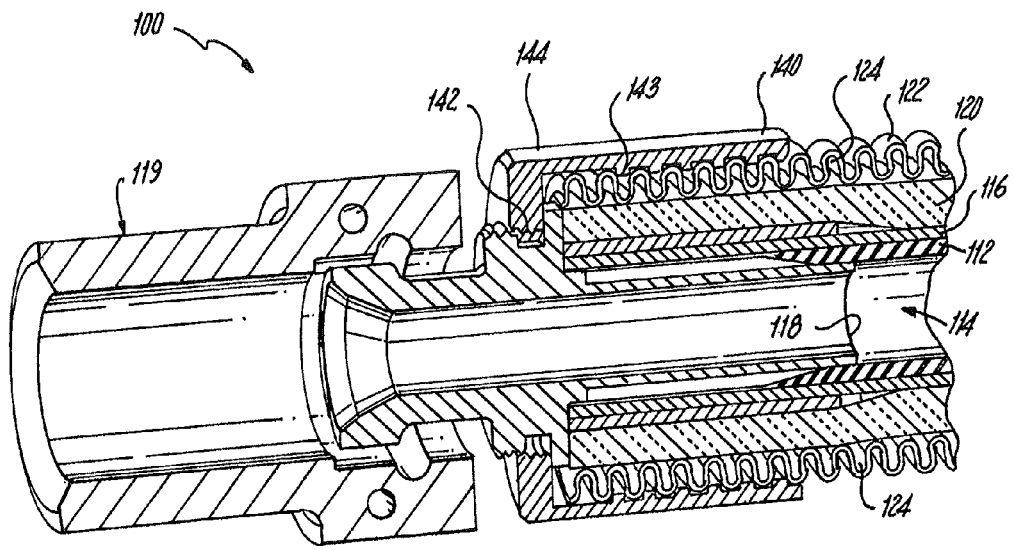
FIG. 1 is a cross-sectional perspective view of a portion of an exemplary embodiment of a segment of a fluid manifold, showing the flexible thermal shield and the outer collar threaded to one end of the flexible thermal shield.

Reference will now be made to the drawings wherein like reference numerals identify similar structural features or aspects of the subject invention. For purposes of explanation and illustration, and not limitation, a partial view of an exemplary embodiment of a segment for a fluid manifold is shown in FIG. 1 and is designated generally by reference character 100. Other embodiments of segments for fluid manifolds, or aspects thereof, are provided in FIGS. 2-3, as will be described. The systems and methods of the invention can be used to improve high temperature operation and flame resistance, for example in fuel manifolds of gas turbine engines.

Manifold segment 100 includes a fuel liner 112 with a fuel passage 114 therethrough. Liner 112 fluidly connects a pair of hose fitting insert 118, each having a nut 119 for connection to a manifold. Wire braid layer 116 surrounds liner 112, and a fire sleeve 120 surrounds wire braid layer 116. Fire sleeve 120 can include a layer of high temperature fiberglass insulation, for example, fire sleeve 120 can include an AS1072 silicone rubber coated fiber glass fire sleeve.

A flexible thermal shield 122 surrounds fire sleeve 120 outboard thereof. An insulation space 124 is defined between fire sleeve 120 and thermal shield 122 to thermally isolate fire sleeve 120, and everything inboard thereof, from conditions external to thermal shield 122. Thermal shield 122 includes a helically corrugated metal tube having opposed first and second ends, which lends flexibility to thermal shield 122 and to manifold segment 100 overall. This flexibility allows for a manifold of assembled segments 100 to be manipulated into place on an engine during installation, for example, as well as allowing accommodation of differential thermal expansion within an engine.

Thermal shield 122 is connected at each end, only one end of which is shown in FIG. 1 for sake of clarity, to the respective hose fitting insert 118 by an outer collar 140 threaded thereto. Outer collar 140 has internal threads 143 which intermesh with the helical coils of thermal shield 122. Additional threads, namely fitting threads 142 engage outer collar 140 to hose fitting insert 118, which has corresponding threads. Internal threads 143 and fitting threads 142 are depicted as having different widths and pitches, however any appropriate thread sizes and pitches can be used without departing from the scope of this disclosure. To increase the engagement of outer collar 140 to thermal shield 122, cylindrical portion 144 of outer collar 140 is crimped inward to ovalized the threads 142 and 143 to prevent outer collar 140 coming unthreaded due to vibrations, for example. Outer threads that are structurally ovalized relative to mating internal threads prevent backing out or unthreading of the threads relative to one another.

Figure 2:
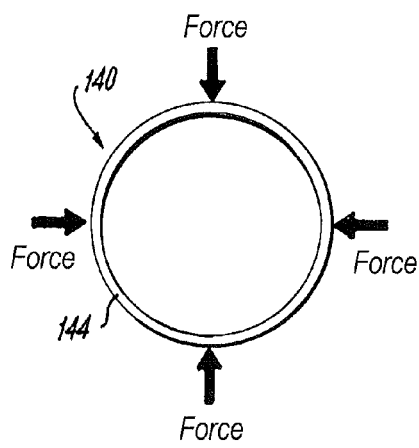
FIG. 2 is a schematic cross-sectional end view of the outer collar of FIG. 1, showing schematically forces being applied from four directions equally spaced to crimp the outer collar.
Figure 3:
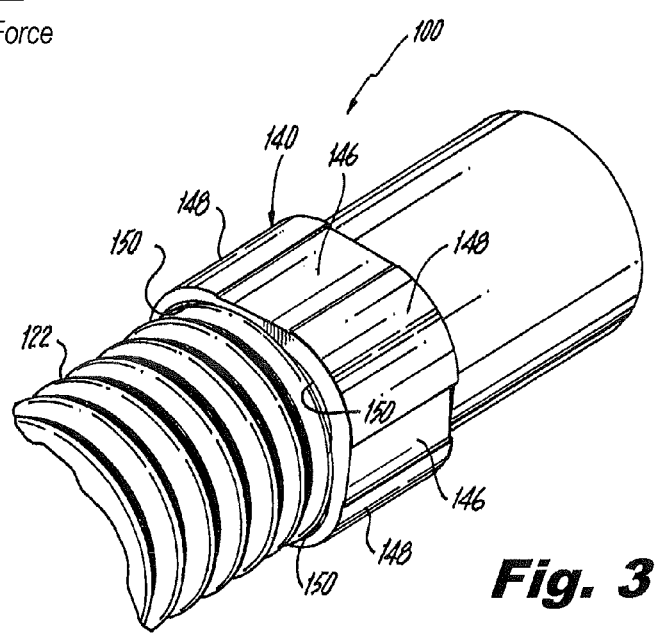
FIG. 3 is a perspective view of a portion of the segment of a fuel manifold of FIG. 1, showing vents between the crimp collar and the flexible thermal shield.

Referring now to FIG. 2, the crimping of outer collar 140 is indicated schematically. The four large arrows indicate the outer collar 140 is crimped in four places circumferentially spaced apart. Crimping in this way leaves a double ovalized structure in outer collar 140, i.e., outer collar 140 has an ovalized structure in two directions, to prevent unthreading as explained above. The resulting structure of outer collar 140 is shown in FIG. 3, which shows two of the four resulting crimped portions 146 of outer collar 140, and two of the four resulting uncrimped portions 148 of outer collar 140. Those skilled in the art will readily appreciate that while only two each of the crimped and uncrimped portions 146 and 148 are indicated in FIG. 3, there are four crimped portions 146 that alternate circumferentially with four uncrimped portions. Those skilled in the art will also readily appreciate that any other suitable number of crimped and uncrimped portions can be used without departing from the scope of this disclosure.

With continued reference to FIG. 3, uncrimped portions 148 are spaced apart from thermal shield 122 more than are crimped portions 146. The space between each uncrimped portion 148 and thermal shield 122 defines a respective air path vent 150 between outer collar 140 and thermal shield 122 in venting communication with the insulation space 124 shown in FIG. 1. Since thermal shield 122 is helical, there is a continuous, helical passage formed in insulation space 124, which can vent outward to an area outside thermal shield 122 through vents 150 on either end of manifold segment 100. Thus, hot gas can escape insulation space 124 when manifold segment 100 is heated, keeping the pressure in insulation space 124 relatively low and maintaining minimal or no liquid ingress.

A fuel manifold for distributing fuel to a gas turbine engine can include a plurality of interconnected manifold segments such as segments 100 described above. Each manifold segment 100 can extend between a pair of fuel injector inlet fittings, for example.

Figure 7:
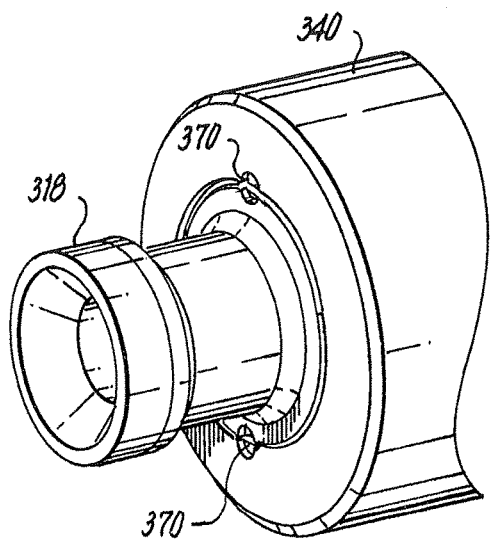
FIG. 7 is a perspective view of a portion of another exemplary embodiment of a segment of a fuel manifold, showing two staked portions locally deformed to prevent de-threading of the outer collar.
Figure 8:
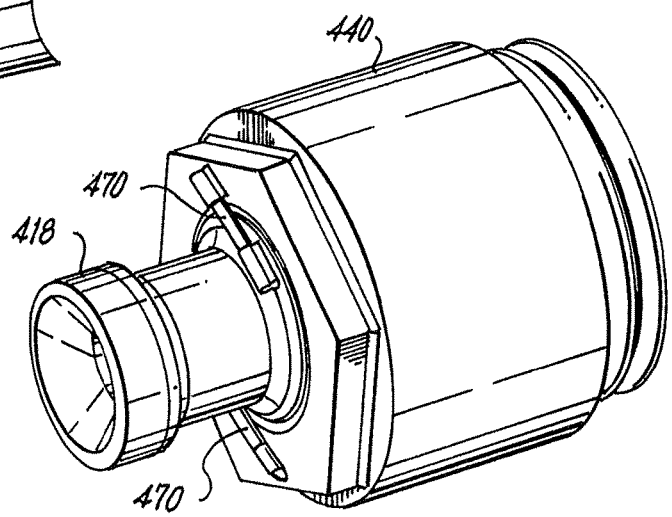
FIG. 8 is a perspective view of a portion of another exemplary embodiment of a segment of a fuel manifold, showing a pair of lock wires, each welded to the outer collar and the hose fitting insert.

Referring now to FIGS. 4-9, other embodiments of manifold segments are shown that provide structures to prevent de-threading of the outer collar from the thermal shield and hose fitting insert. In FIG. 4, a lock wire 270 connects outer collar 240 to the hose fitting insert 218 engaged to outer collar 240 to prevent de-threading of outer collar 270. FIG. 5 shows how outer collar 240 is torqued into place on hose fitting insert 218, and FIG. 6 indicates schematically with a force arrow how outer collar 240 bottoms out on the flange of hose fitting insert 218. Lock wire 270, which can also be a cable or any other suitable structure, connects between respective holes in the outer collar 240 and insert 218. The enlarged ends of lock wire 218 prevent it from releasing insert 218 and outer collar 240 to prevent de-threading of outer collar 240. Two similar locking wires 470 connect insert 418 to outer collar 440 are shown in FIG. 8, wherein each wire 470 is tack welded to each of the outer collar 440 and insert 418 to provide anti-rotation of collar 440 relative to insert 418. Any other suitable number of wires, cables, or the like can be used. Outer collar 440 includes a hex portion to facilitate torqueing of outer collar 440 onto insert 418.

Figure 9:
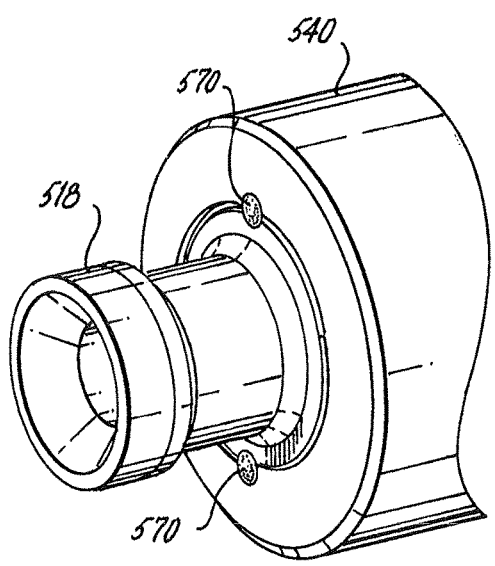
FIG. 9 is a perspective view of a portion of another exemplary embodiment of a segment of a fuel manifold, showing two welds preventing de-threading of the outer collar.

In FIG. 7, collar 340 and hose fitting insert 318 engaged thereto include two staked portions 370 that are each locally plastically deformed to prevent de-threading of the outer collar. This can be accomplished by torqueing collar 340 onto insert 318 as described above, and then using a punch to locally deform the threads of insert 318 and collar 340 in two locations. Any other suitable number of staked locations can be used. In FIG. 9 two equally spaced tack welds 570 join outer collar 540 to hose fitting insert 518 to provide the anti-rotation after collar 540 is torqued into place. Any suitable number of welds can be used. In the embodiments shown in FIGS. 4-9, venting from the insulation space is provided through the threads between the respective outer collars and heat shields.

While the description above provides exemplary materials for the various components, those skilled in the art will readily appreciate that any suitable materials can be used for the various components without departing from the scope of this disclosure. Moreover, while manifold segments have been described above in the exemplary context of fuel manifolds for gas turbine engines, those skilled in the art will readily appreciate that manifolds or segments as described above can be used in any suitable application without departing from the scope of this disclosure. For example, fluid manifold segments in accordance with those above can be used advantageously in hydraulic lines in high temperature environments, or in environments with potential fire risk.

The methods and systems of the present disclosure, as described above and shown in the drawings, provide for flexible fuel manifolds and fluid manifold segments with superior properties including high temperature operation and flame resistance, while maintaining flexibility to handle thermal expansion and contraction. Moreover, the examples provided above have the additional advantage of precluding unwanted ingress of liquids such as fuel into the insulation space of the manifold segments. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A segment of a fluid manifold for a gas turbine engine comprising:
    a flexible thermal shield with an insulation space defined inboard of the flexible thermal shield to provide thermal isolation from conditions external to the flexible thermal shield, wherein the flexible thermal shield includes a helically corrugated metal tube having opposed first and second ends; and
    an outer collar threaded to a first end of the helically corrugated metal tube, wherein a vent is defined between the outer collar and the flexible thermal shield in venting communication with the insulation space.

2. A segment of a fluid manifold as recited in claim 1, wherein the outer collar includes a crimped portion and an uncrimped portion, the uncrimped portion being spaced apart from the helically corrugated metal tube more than the crimped portion to define the vent between the outer collar and the helically corrugated metal tube in venting communication with the insulation space.

3. A segment of a fluid manifold as recited in claim 2, wherein there are four crimped portions circumferentially alternating with four respective uncrimped portions to form four vents from the insulation space to an area outside the flexible thermal shield.

4. A segment of a fluid manifold as recited in claim 1, further comprising a liner defining an internal fluid passage therethrough fluidly connecting a pair of hose fitting inserts, wherein the flexible thermal shield is outboard of the liner, and wherein the insulation space is defined between the liner and the flexible thermal shield.

5. A segment of a fluid manifold as recited in claim 4, wherein the outer collar includes fitting threads engaged with threads on one of the hose fitting inserts, and wherein the fitting threads of the outer collar are structurally ovalized relative to the threads of the hose fitting insert engaged thereto to prevent unthreading of the outer collar.

6. A segment of a fluid manifold as recited in claim 4, further comprising a lock wire connecting the outer collar to the hose fitting insert engaged thereto to prevent de-threading of the outer collar.

7. A segment of a fluid manifold as recited in claim 6, further comprising a weld joining the lock wire to the outer collar and a weld joining the lock wire to the hose fitting insert engaged to the outer collar.

8. A segment of a fluid manifold as recited in claim 4, further comprising a cable connecting the outer collar to the hose fitting insert engaged thereto to prevent de-threading of the outer collar.

9. A segment of a fluid manifold as recited in claim 4, wherein the collar and the hose fitting insert engaged thereto include at least one staked portion that is locally deformed to prevent de-threading of the outer collar.

10. A segment of a fluid manifold as recited in claim 4, further comprising at least one weld joining the outer collar to the hose fitting insert engaged to the outer collar.

11. A fuel manifold for distributing fuel to a gas turbine engine comprising:
a plurality of interconnected manifold segments, each manifold segment extending between a pair of fuel injector inlet fittings, wherein each manifold segment includes:
a flexible thermal shield with an insulation space is defined inboard of the flexible thermal shield to provide thermal isolation from conditions external to the flexible thermal shield, wherein the flexible thermal shield includes a helically corrugated metal tube having opposed first and second ends; and
an outer collar threaded to a first end of the helically corrugated metal tube, wherein a vent is defined between the outer collar and the flexible thermal shield in venting communication with the insulation space.

12. A fuel manifold as recited in claim 11, wherein the outer collar includes a crimped portion and an uncrimped portion, the uncrimped portion being spaced apart from the corrugated helical metal tube more than the crimped portion to define the vent between the outer collar and the corrugated helical metal tube in venting communication with the insulation space.

13. A fuel manifold as recited in claim 12, wherein there are four crimped portions circumferentially alternating with four respective uncrimped portions to form four vents from the insulation space to an area outside the flexible thermal shield.

14. A fuel manifold as recited in claim 11, wherein each manifold segment includes a liner defining an internal fluid passage therethrough fluidly connecting a pair of hose fitting inserts, wherein the flexible thermal shield is outboard of the liner, and wherein the insulation space is defined between the liner and the flexible thermal shield.

15. A fuel manifold as recited in claim 14, wherein the outer collar of each manifold segment includes fitting threads engaged with threads on one of the hose fitting inserts, and wherein the fitting threads of the outer collar are structurally ovalized relative to the threads of the hose fitting insert engaged thereto to prevent unthreading of the outer collar.

16. A fuel manifold as recited in claim 14, further comprising a lock wire connecting the outer collar to the hose fitting insert engaged thereto to prevent de-threading of the outer collar.

17. A fuel manifold as recited in claim 16, further comprising a weld joining the lock wire to the outer collar and a weld joining the lock wire to the hose fitting insert engaged to the outer collar.

18. A fuel manifold as recited in claim 14, further comprising a cable connecting the outer collar to the hose fitting insert engaged thereto to prevent de-threading of the outer collar.

19. A fuel manifold as recited in claim 14, wherein the collar and the hose fitting insert engaged thereto include at least one staked portion that is locally deformed to prevent de-threading of the outer collar.

20. A fuel manifold as recited in claim 14, further comprising at least one weld joining the outer collar to the hose fitting insert engaged to the outer collar.

* * * * *